(12) United States Patent
Rouille et al.

(10) Patent No.: US 7,267,266 B2
(45) Date of Patent: Sep. 11, 2007

(54) SECURITY SYSTEM

(76) Inventors: David W. Rouille, 1 Sarah La., Maynard, MA (US) 01754; Catherine J. Rouille, 1 Sarah La., Maynard, MA (US) 01754

(*) Notice: Subject to any disclaimer, the term of this patent is extended or adjusted under 35 U.S.C. 154(b) by 79 days.

(21) Appl. No.: 10/888,405

(22) Filed: Jul. 10, 2004

(65) Prior Publication Data

US 2005/0006462 A1  Jan. 13, 2005

Related U.S. Application Data

(60) Provisional application No. 60/486,012, filed on Jul. 10, 2003, provisional application No. 60/486,043, filed on Jul. 10, 2003, provisional application No. 60/486,042, filed on Jul. 10, 2003.

(51) Int. Cl.
| | |
|---|---|
| G06Q 99/00 | (2006.01) |
| H04K 1/00 | (2006.01) |
| H04L 9/00 | (2006.01) |
| G06K 19/06 | (2006.01) |
| G06K 5/00 | (2006.01) |

(52) U.S. Cl. .............. 235/380; 235/492; 235/382; 235/493; 705/64

(58) Field of Classification Search ........ 235/382, 235/380, 383, 382.5, 435, 439, 449, 492, 235/493, 451; 713/170; 340/539.1, 572.8, 340/5.61; 705/39–41, 64
See application file for complete search history.

(56) References Cited

U.S. PATENT DOCUMENTS

| | | | | |
|---|---|---|---|---|
| 5,120,939 A | * | 6/1992 | Claus et al. ............ 235/382 |
| 5,412,192 A | * | 5/1995 | Hoss ..................... 235/380 |
| 5,539,394 A | * | 7/1996 | Cato et al. ............ 340/10.32 |
| 5,613,159 A | * | 3/1997 | Colnot .................. 710/11 |
| 5,812,065 A | * | 9/1998 | Schrott et al. ........ 340/10.34 |
| 5,828,044 A | * | 10/1998 | Jun et al. ............. 235/492 |
| 5,896,325 A | * | 4/1999 | Fujioka ............. 365/189.07 |
| 5,914,657 A | * | 6/1999 | Chen .................. 340/568.7 |
| 5,926,110 A | * | 7/1999 | Downs et al. ........ 340/10.51 |
| 6,047,888 A | * | 4/2000 | Dethloff .............. 235/380 |
| 6,070,795 A | * | 6/2000 | Feiken ................ 235/492 |
| 6,098,879 A | * | 8/2000 | Terranova ........... 235/384 |
| 6,111,506 A | * | 8/2000 | Yap et al. ............ 340/572.1 |
| 6,257,486 B1 | * | 7/2001 | Teicher et al. ........ 235/380 |
| 6,273,335 B1 | * | 8/2001 | Sloan ................. 235/382 |
| 6,398,115 B2 | * | 6/2002 | Krause ................ 235/492 |
| 6,726,099 B2 | * | 4/2004 | Becker et al. ........ 235/380 |
| 6,778,066 B2 | * | 8/2004 | Smith ................. 340/5.61 |
| 6,955,299 B1 | * | 10/2005 | Pathmasuntharan et al. ................ 235/492 |
| 6,967,575 B1 | * | 11/2005 | Dohrmann et al. .... 340/568.1 |
| 2003/0030542 A1 | * | 2/2003 | von Hoffmann ...... 340/5.61 |
| 2003/0034891 A1 | * | 2/2003 | Pedersen ............. 340/568.7 |
| 2003/0106935 A1 | * | 6/2003 | Burchette ............ 235/380 |

(Continued)

*Primary Examiner*—Michael G. Lee
*Assistant Examiner*—Thien T Mai
(74) *Attorney, Agent, or Firm*—David W. Rouille; Catherine J. Rouille

(57) ABSTRACT

In accordance with the present invention, an apparatus is provided wherein a device is disabled if the device is located more then a predetermined distance away from the owner. Accordingly, a lost or stolen device is rendered unusable. The device has coupled thereto a receiver or transceiver. A transmitter or transceiver is located separately from the device. When the receiver and transmitter can communicate, the device is usable, when the receiver and transmitter cannot communicate, the receiver disables the device, rendering the device unusable.

9 Claims, 2 Drawing Sheets

U.S. PATENT DOCUMENTS

| | | | |
|---|---|---|---|
| 2003/0200008 A1* | 10/2003 | Wilson | 700/236 |
| 2003/0210128 A1* | 11/2003 | Dix | 180/287 |
| 2004/0099746 A1* | 5/2004 | Norton | 235/492 |
| 2004/0128508 A1* | 7/2004 | Wheeler et al. | 713/170 |
| 2004/0199474 A1* | 10/2004 | Ritter | 705/65 |
| 2005/0006466 A1* | 1/2005 | Overhultz et al. | 235/383 |
| 2005/0029345 A1* | 2/2005 | Waterhouse et al. | 235/382 |
| 2005/0162269 A1* | 7/2005 | Lambright et al. | 235/375 |

\* cited by examiner

SECURITY SYSTEM

CROSS REFERENCE TO RELATED APPLICATIONS

This application claims the benefit of provisional patent application Ser. No. 60/486,012 filed Jul. 10, 2003, provisional patent application Ser. No. 60/486,043 filed Jul. 10, 2003 and provisional patent application Ser. No. 60/486,042 filed Jul. 10, 2003, the disclosures of which are incorporated herein by reference.

STATEMENT REGARDING FEDERALLY SPONSORED RESEARCH

Not Applicable

BACKGROUND OF THE INVENTION

Credit cards are well known and are commonly used for purchasing items. A problem associated with credit cards is that they may be easily lost or stolen. A lost or stolen credit card may then be used to purchase items that the rightful owner of the credit card does not intend. This leads to millions of dollars of unauthorized purchases being transacted every year, with the cost being paid by the credit card company and/or the credit card owner.

Electronic devices such as cellular telephones, Personal Digital Assistants (PDAs) and laptop computers are well known and are commonly used for all sorts of activities by a large number of people. A problem associated with these electronic devices is that they may be easily lost or stolen. A lost or stolen cell phone can be used to make calls and accumulate large phone bills. A lost PDA can result in the loss of private or crucial personal and business information. The loss of a laptop computer can result in confidential data being disclosed.

SUMMARY OF THE INVENTION

In accordance with one embodiment of the present invention, an apparatus is provided wherein a credit card is disabled if the card is located more then a predetermined distance away from the owner. Accordingly, a lost or stolen credit card is rendered unusable. The card has coupled thereto a receiver or transceiver. A transmitter or transceiver is located separately from the card. When the receiver and transmitter can communicate, the card is usable, when the receiver and transmitter cannot communicate; the receiver disables the card, rendering the card unusable.

In accordance with another embodiment of the present invention, an apparatus is provided wherein an electronic device is disabled if the device is located more then a predetermined distance away from the owner. Accordingly, a lost or stolen device is rendered unusable. The device card has integrated therein a receiver or transceiver. A transmitter or transceiver is located separately from the device. When the receiver and transmitter can communicate, the device card is usable, when the receiver and transmitter cannot communicate; the receiver disables the device, rendering the device unusable.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
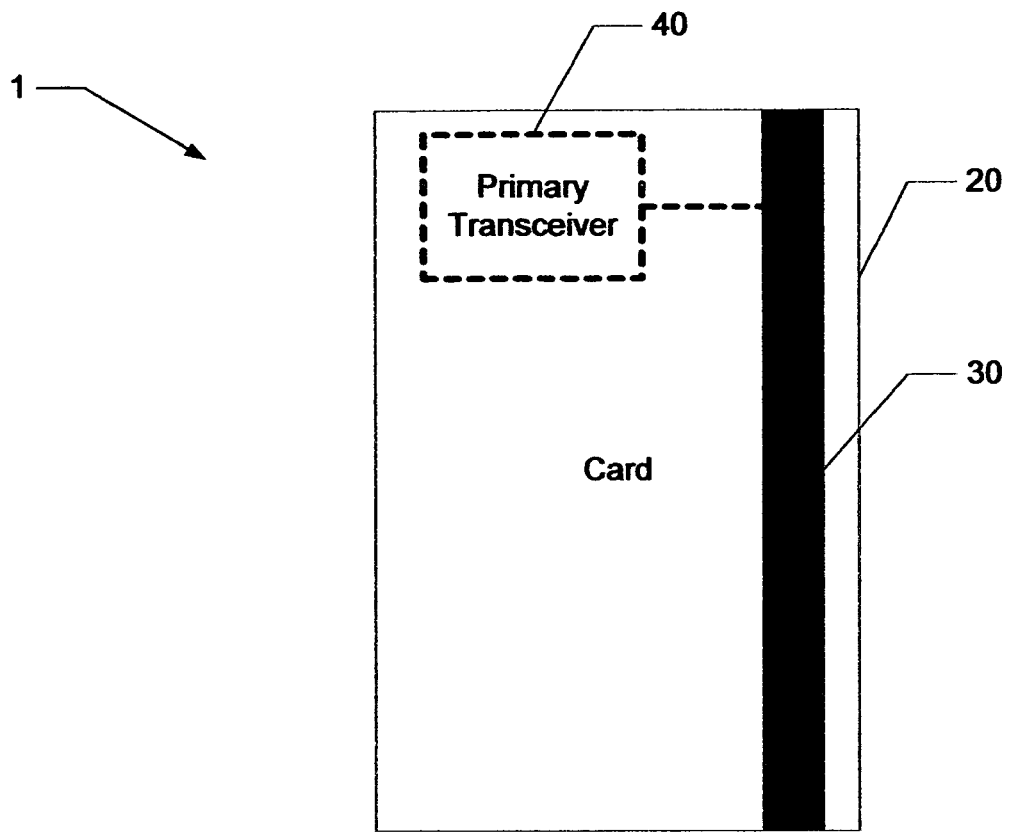
FIG. 1 comprises a block diagram showing the apparatus of the present invention coupled to a card.

A Radio Frequency Communications System (RFCS) comprises two major components: a Radio Frequency (RF) primary transceiver and a corresponding RF secondary transceiver. The primary and secondary transceivers communicate via radio frequencies (RF). The primary transceiver and secondary transceiver can communicate without line-of-sight, through non-conducting material, at a high rate, and over a distance of several feet. Additionally, the size of a transceiver is very small (smaller than a postage stamp) and the cost very low (less than 10 cents for a passive transceiver).

The secondary transceiver comprises a small microchip attached to an antenna. The secondary transceiver may be active or passive. An active transceiver has its own power source, such as a battery. A passive transceiver receives power from the primary transceiver signal. A passive transceiver may have a range of about 30 feet, while an active transceiver can have a range of up to 3000 feet. The transceiver can be tuned to provide the desired range for the application.

The primary transceiver interrogates one or more secondary transceivers to determine if the secondary transceiver is within range of the primary transceiver, referred to as "pinging" the secondary transceiver(s). If a secondary transceiver responds to the ping, then the secondary transceiver is within the range of the primary transceiver. On the other hand, if the secondary transceiver does not respond to the ping, then the secondary receiver is out of range of the primary transceiver. Optionally, a single primary transceiver may be used with multiple secondary transceivers, which each secondary transceiver having an individual identification number (IN), such that a response to a ping includes the ID number of the secondary transceiver and the primary transceiver can detect which of the secondary transceivers responded to the ping. Further, the primary transceiver may send pings that include an ID number of a transceiver and the transceiver will only respond to a ping that includes the transceivers ID number.

Secondary transceivers receive power by harvesting energy from the electromagnetic field of the primary transceiver's communication signal. Passive transceivers both receive power and communicate within a narrow band of radio frequencies specified by regulation agencies such as the Federal Communications Commission (FCC). The center of this band of frequencies is denoted as $f$. When referring to RFCS operating at frequency $f$, it is implied that this is the center of an operating band of frequencies.

Passive transceivers typically receive power through inductive coupling or through far-field energy harvesting. Inductive coupling uses the magnet field generated by the primary transceiver to induce an electric current through a coupling element, usually an antenna and a capacitor. The current from coupling charges a capacitor that provides voltage and power to the secondary transceiver. Inductive coupling works in the near-field of the communication signal, which extends a $1/2\pi$ times a signal's wavelength from the source.

The operating voltage of an inductively coupled secondary transceiver depends on the flux density at that range from the primary transceiver. At a distance d, the magnetic field emitted by a primary transceiver has decreased to $1/d^3$ its original strength. For a circularly coiled reader antenna with radius R, the flux is maximized at distance d when R approximately equals the square root of 2 d. Thus, increasing R increases the range of optimal communication.

Besides inductive coupling, passive transceivers may be powered by collecting energy from the far field which is the range outside $\frac{1}{2}\pi$ the wavelength of a signal. As with inductive coupling, the power available to a transceiver decreases proportional to the distance from the reader, in this case, at a rate of $1/d^2$.

Most RFCS operate in the Industrial-Scientific-Medical (ISM) bands which are available for low power short range RFCS. In the United States, the most common ISM bands used by RFCS are 13.56 MHz and 902-928 MHz. Low frequency licenses are also available in the 9 kHz-135 kHz bands. Devices operating in each band are subject to different power and bandwidth regulations. For example RFCS operating in the 13.56 MHz band are limited to a bandwidth of 14 kHz in the forward channel.

Referring to FIG. 1 a block diagram of a particular embodiment of the apparatus of the present invention is shown. An RFCS 1 is comprised of receiver or primary transceiver 40 and a transmitter or secondary transceiver 50. In order to provide security for a credit card 20, the primary transceiver is either coupled to or integrated with a credit card 20. While the description uses a credit card, it should be understood that similar types of financial transaction cards such as ATM cards, debit cards, gift cards and the like are also within the scope of the present invention, therefore the term credit card as used herein is understood to also include these other types of financial transaction cards.

The credit card 20 includes a magnetic strip 30 that contains coded information. The primary transceiver 40 is coupled to the magnetic strip of credit card 20. In operation the primary transceiver pings the secondary transceiver. If the secondary transceiver is with in the range of the primary transceiver 40, the secondary transceiver responds to the ping with an answer. The answer is received by the primary transceiver and the credit card is usable.

When the primary transceiver pings the secondary transceiver and the secondary transceiver is out of range then the primary transceiver does not receive a response and the primary transceiver disables the magnetic strip, thus rendering the card 20 unusable.

The secondary transceiver is located separately from the primary transceiver such as being installed on a key ring or in a wallet, purse, or other article that a person would normally have with them when using their credit card. Thus, under normal circumstances, the primary transceiver (disposed on the card or integrated with the card) is located within the range of the secondary transceiver and the card functions normally. However, of the card is lost or stolen, chances are that the card will be located a distance away from the secondary transceiver which is located on the owners key ring or wallet or purse and as such, the primary receiver would not receive an answer to a ping, and the primary transceiver disables the magnetic strip, rendering the card unusable.

The primary transceiver may include a timing circuit such that the pings are made at regular intervals, such as once an hour, once every four hours, once a day or any desired time interval. This helps save battery life of the primary transceiver.

In an alternate embodiment the secondary transceiver is located on or integrated with the card and is coupled to the magnetic strip of credit card, while the primary transceiver is located remotely from the card. In operation the primary transceiver pings the secondary transceiver. If the secondary transceiver is with in the range of the primary transceiver 40, the secondary transceiver detects the ping and the credit card is usable.

When the primary transceiver pings the secondary transceiver and the secondary transceiver is out of range then the secondary transceiver (not having received a ping for a predetermined amount of time) disables the magnetic strip, thus rendering the card 20 unusable.

When the card is rendered unusable, preferably the card is not permanently unusable, but can be made usable again once the secondary transceiver is within range of the primary transceiver. Optionally, the card can be made permanently unusable once the secondary transceiver is out of range of the primary transceiver (e.g. by magnetically altering the information on the magnetic strip).

Figure 2:
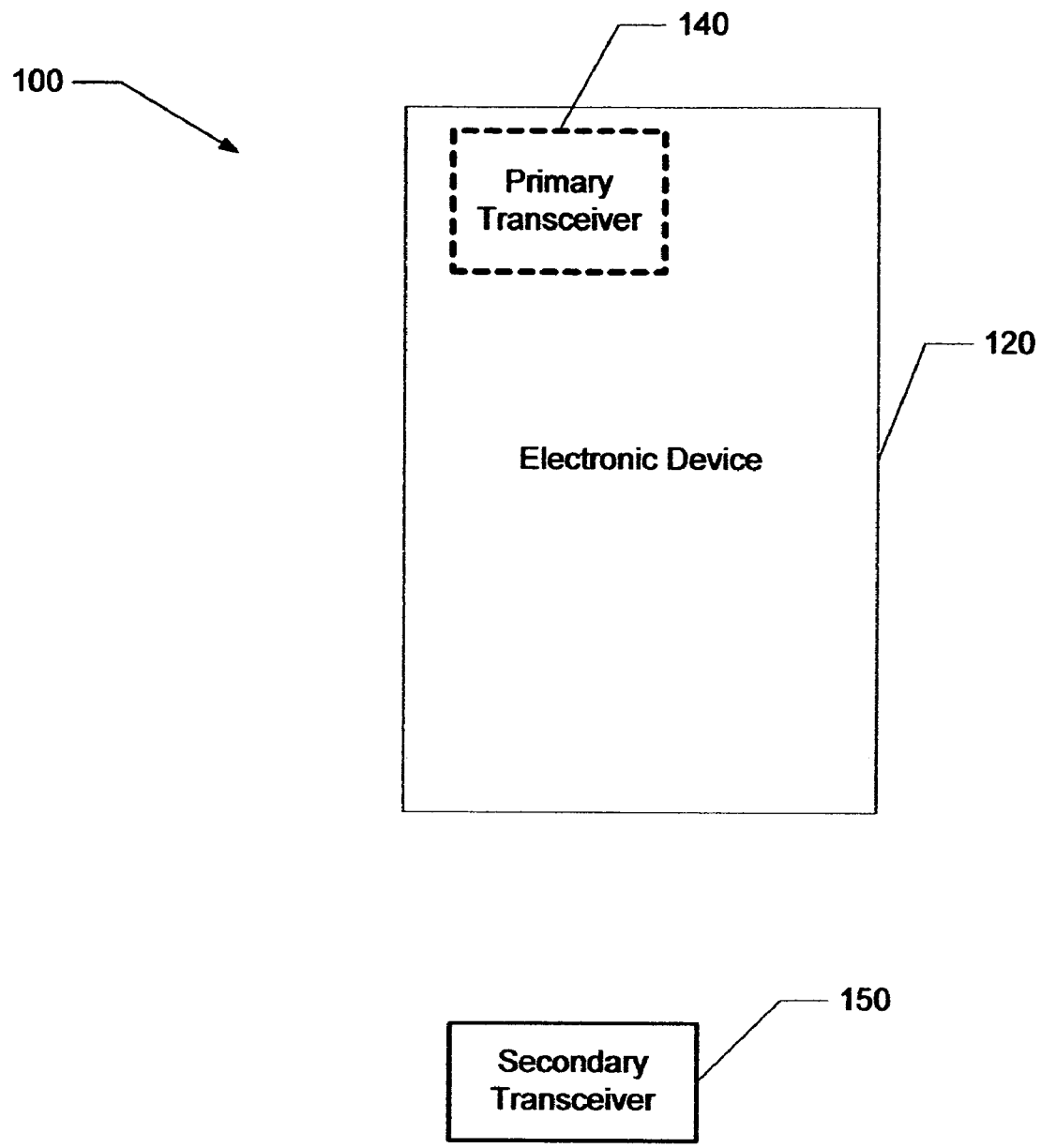
FIG. 2 comprises a block diagram showing the apparatus of the present invention coupled to a device.

Referring now to FIG. 2, a block diagram of another embodiment of the apparatus of the present invention is shown. An RFCS 100 is comprised of receiver or primary transceiver 140 and a transmitter or secondary transceiver 150. In order to provide security for a device 120, the primary transceiver is either coupled to or integrated with the device 120.

The primary transceiver 140 is coupled to the device such that the transceiver is utilized as part of a power-up sequence or an activity sequence. In operation, during power-up or an activity the primary transceiver pings the secondary transceiver. If the secondary transceiver is with in the range of the primary transceiver 140, the secondary transceiver responds to the ping with an answer. The answer is received by the primary transceiver and the activity or power-up sequence continues.

When the primary transceiver pings the secondary transceiver and the secondary transceiver is out of range then the primary transceiver does not receive a response and the primary transceiver prevents execution of the power-up sequence or activity, thus rendering the device 120 unusable. In the case where the device is a cellular telephone, the activity may be sending a call, typically performed by entering a telephone number and pushing a "SEND" button on the phone. The pushing of the "SEND" button in this instance results in the primary transceiver sending a ping to the secondary transceiver and if a response is received, the "SEND" operation is allowed to complete and the call is initiated. However, if there is no response received by the primary transceiver, then the "SEND" operation terminates without the call being dialed, rendering the phone unusable for outgoing calls. A similar situation occurs when the "SEND" button is used to answer a ringing phone. Before the call is answered, the primary transceiver sends a ping to the secondary transceiver and if a response is received, the "SEND" operation is allowed to complete and the call is answered. However if there is no response received by the primary transceiver, then the "SEND" operation terminates without the call being answered, rendering the phone unusable to receive incoming calls.

The secondary transceiver is located separately from the primary transceiver such as being installed on a key ring or in a wallet, purse, or other article that a person would normally have with them when using their credit card. Thus, under normal circumstances, the primary transceiver (disposed within the device) is located within the range of the secondary transceiver and the device functions normally. However, of the device is lost or stolen, chances are that the device will be located a distance away from the secondary transceiver which is located on the owners key ring or wallet or purse and as such, the primary receiver would not receive an answer to a ping, and the primary transceiver disables the execution of a power-up sequence or activity, rendering the device unusable.

When the device is rendered unusable, preferably the device is not permanently unusable, but can be made usable again once the secondary transceiver is within range of the primary transceiver. Optionally, the device can be made permanently unusable once the secondary transceiver is out of range of the primary transceiver.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A security device for a financial transaction card consisting of:
    a primary transceiver coupled to a financial transaction card; and
    a secondary transceiver wherein said primary transceiver has a transmit range defining an area within which said primary transceiver can communicate with said secondary transceiver and wherein said primary transceiver of said financial transaction card attempts to communicate with said secondary transceiver by said primary transceiver sending only a first communication to said secondary transceiver which is received by said secondary receiver and wherein said secondary transceiver responds to said first communication by sending only a first response to said first communication to said primary transceiver and wherein upon said primary transceiver receiving said response, said primary transceiver enables said financial transaction card for use in a financial transaction with another device and wherein when said primary transceiver of said financial transaction card cannot communicate with said secondary transceiver because said secondary transceiver is outside of said transmit range of said primary transceiver said financial transaction card is disabled from performing a financial transaction with another device.

2. The security device of claim 1 wherein said financial transaction card comprises a credit card.

3. The security device of claim 1 wherein said financial transaction card is selected from the group comprising an Automated Teller Machine (ATM) card, a debit card, and a gift card.

4. The security device of claim 1 wherein said primary transceiver comprises an active transceiver.

5. The security device of claim 1 wherein said primary transceiver comprises a passive transceiver.

6. The security device of claim 1 wherein said secondary transceiver comprises an active transceiver.

7. The security device of claim 1 wherein said secondary transceiver comprises a passive transceiver.

8. The security device of claim 1 wherein said first communication comprises a ping.

9. The security device of claim 8 wherein said response to first communication comprises a response to said ping.

\* \* \* \* \*